US008599947B2

United States Patent
Chun et al.

(10) Patent No.: US 8,599,947 B2
(45) Date of Patent: Dec. 3, 2013

(54) METHOD OF TRANSMITTING CONTROL INFORMATION IN MULTIPLE ANTENNA SYSTEM

(75) Inventors: Jin Young Chun, Anyang-si (KR); Bin Chul Ihm, Anyang-si (KR); Wook Bong Lee, Anyang-si (KR); Moon Il Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 12/451,569

(22) PCT Filed: Jun. 5, 2008

(86) PCT No.: PCT/KR2008/003152
§ 371 (c)(1),
(2), (4) Date: Nov. 19, 2009

(87) PCT Pub. No.: WO2008/150114
PCT Pub. Date: Dec. 11, 2008

(65) Prior Publication Data
US 2010/0067616 A1    Mar. 18, 2010

Related U.S. Application Data

(60) Provisional application No. 60/942,020, filed on Jun. 5, 2007.

(30) Foreign Application Priority Data

Jun. 15, 2007    (KR) .......................... 10-2007-0058709

(51) Int. Cl.
*H04B 7/02*    (2006.01)

(52) U.S. Cl.
USPC ............................................. 375/267

(58) Field of Classification Search
USPC ......... 375/267, 227, 130, 219, 259, 260, 295, 375/316, 343; 370/468, 252; 455/69, 62, 455/67.11; 704/500
See application file for complete search history.

(56) References Cited

U.S. PATENT DOCUMENTS

| | | | |
|---|---|---|---|
| 2003/0148738 A1* | 8/2003 | Das et al. ...................... 455/67.5 |
| 2006/0116080 A1* | 6/2006 | Eom ................................ 455/62 |
| 2006/0146760 A1* | 7/2006 | Khandekar et al. ........... 370/335 |
| 2007/0026813 A1* | 2/2007 | Khan ................................. 455/69 |
| 2007/0098093 A1* | 5/2007 | Kwon et al. ................... 375/260 |
| 2008/0101407 A1* | 5/2008 | Khan et al. .................... 370/468 |
| 2008/0212701 A1* | 9/2008 | Pan et al. ....................... 375/260 |
| 2008/0268862 A1* | 10/2008 | Kent et al. .................. 455/452.2 |
| 2008/0298482 A1* | 12/2008 | Rensburg et al. ............. 375/260 |

FOREIGN PATENT DOCUMENTS

EP    1575234 A2    9/2005
WO    WO 2004/051872 A2    6/2004

* cited by examiner

*Primary Examiner* — Sam K Ahn
*Assistant Examiner* — Shawkat M Ali
(74) *Attorney, Agent, or Firm* — McKenna Long & Aldridge LLP (57) ABSTRACT

A method of transmitting control information in a multiple antenna system includes obtaining a channel quality indicator (CQI) of a first layer, obtaining a differential value between a CQI of a second layer and the CQI of the first layer, transmitting the CQI of the first layer, and transmitting the differential value.

5 Claims, 5 Drawing Sheets

METHOD OF TRANSMITTING CONTROL INFORMATION IN MULTIPLE ANTENNA SYSTEM

This application claims the benefit of PCT/KR2008/003152, filed on Jun. 5, 2008, along with U.S. Provisional Application Ser. No. 60/942,020 filed Jun. 5, 2007 and Korean Patent Application No. 10-2007-0058709, filed Jun. 15, 2007, all of which are hereby incorporated herein by reference for all purposes in their entireties

TECHNICAL FIELD

The present invention relates to a method of transmitting control information in a multiple antenna system, and more particularly, to a method of transmitting control information, whereby a channel quality indicator (CQI) for a plurality of layers and a precoding matrix indicator (PMI) can be efficiently transmitted.

BACKGROUND ART

A multiple-input multiple-output (MIMO) system uses multiple transmit antennas and multiple receive antennas to improve efficiency of data transmission and reception. A MIMO technology includes spatial diversity and spatial multiplexing. The spatial diversity is a technique in which the multiple transmit antennas transmit the same data and thus transmission reliability increases. The spatial multiplexing is a technique in which the multiple transmit antennas simultaneously transmit different data and thus data at high data rate can be transmitted without increasing a system bandwidth.

In conventional wireless communication system, one base station (BS) provides services to a plurality of user equipments (UEs). In order to efficiently provide a data service to the plurality of UEs, the BS schedules and transmits user data according to a channel condition. For this, the UEs transmit a channel quality indicator (CQI) to the BS in a subframe. The subframe is a scheduling unit of transmission. User data and control information are carried together in the subframe. In the subframe, a channel for carrying the user data is referred to as a data channel and a channel for carrying the control information is referred to as a control channel.

The subframe has a fixed interval which is called as transmission time interval (TTI). Amount of radio resources for the data channel and the control channel are restricted by each other in the subframe. When large amount of radio resources are allocated to the control channel, that of radio resources for the data channel is decreased, and thus a data rate is decreased. Therefore, amount of radio resources for the control channel is smaller than that of radio resources for the data channel in order to improve the data rate.

The multiple antenna system can transmit multiple data streams on a plurality of spatial layers. To efficiently scheduling the plurality of spatial layers, a BS needs to know various control information. A CQI indicates downlink channel condition. If a CQI for each of the plurality of spatial layers is reported, the number of CQI which is transmitted on the control channel by a UE increases as much as that of the spatial layers. As a result, amount of radio resources for the control channel increases. In addition, a precoding matrix indicator (PMI) and a rank indicator (RI) are also required to be reported to the BS in the multiple antenna system. The PMI is used to determine a precoding matrix for the BS to perform precoding. The RI is used to determine the number of spatial layer.

DISCLOSURE OF INVENTION

Technical Problem

Accordingly, there is a need for a method capability of efficiently transmitting control information of a multiple antenna system on a control channel allocated to limited amount of radio resources.

Technical Solution

According to an aspect of the present invention, a method of transmitting control information in a multiple antenna system is provided. The method includes obtaining a channel quality indicator (CQI) of a first layer, obtaining a differential value between a CQI of a second layer and the CQI of the first layer, transmitting the CQI of the first layer, and transmitting the differential value.

According to another aspect of the present invention, a method of transmitting control information in a multiple antenna system is provided. The method includes transmitting a CQI of a first layer and a CQI of other layers in a first transmission period, transmitting a differential value between the CQI of the first layer in a second transmission period and the CQI of the first layer transmitted in the first transmission period, and transmitting a differential value between the CQI of other layers in a third transmission period and the CQI of other layers transmitted in the first transmission period.

Advantageous Effects

Control signals for operating multiple antenna system can be efficiently transmitted

MODE FOR THE INVENTION

Techniques described hereinafter may be used in a variety of communication systems, such as, a code division multiple access (CDMA) system, a wideband CDMA (WCDMA) system, a frequency division multiple access (FDMA) system, an orthogonal frequency division multiplexing (OFDM)-based system, an orthogonal frequency division multiple access (OFDMA) system, etc. The OFDM is a multicarrier modulation technique in which the entire system bandwidth is efficiently split into a plurality of orthogonal subbands. The subband may be referenced by a tone, a resource block, a bin, etc. Each subband is associated with each subcarrier whose data is modulated.

The present invention will now be disclosed more fully with reference to the accompanying drawings, in which exemplary embodiments of the invention are shown. These embodiments are provided so that this disclosure will be thorough and complete, and will fully convey the concept of the invention to those skilled in the art.

Figure 1:
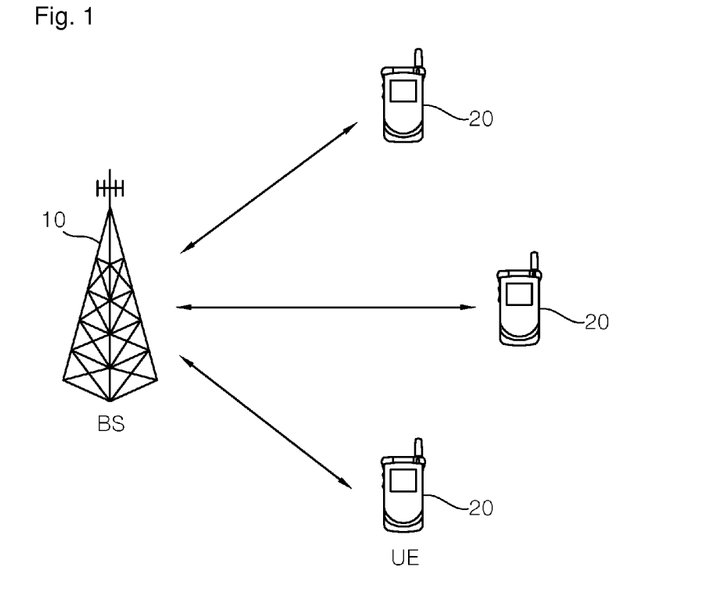
FIG. 1 shows an example of a wireless communication system.

FIG. 1 shows an example of a wireless communication system.

Referring to FIG. 1, a wireless communication system includes a base station (BS) 10 and at least one user equipment (UE) 20. At least one cell is deployed for one BS 10. The wireless communication system can be widely deployed to provide a variety of communication services, such as voices, packet data, etc.

The BS 10 is generally a fixed station that communicates with the UE 20 and may be referred to as another terminology, such as a node-B, a base transceiver system (BTS), an access point, etc. The UE 20 may be fixed or mobile, and may be referred to as another terminology, such as a mobile station (MS), a user terminal (UT), a subscriber station (SS), a wireless device, etc. The BS 10 and the UE 20 each include a transmitter and a receiver.

Downlink represents transmission from the BS 10 to the UE 20, and uplink represents transmission from the UE 20 to the BS 10. In downlink, the transmitter may be a part of the BS 10, and the receiver may be a part of the UE 20. In uplink, the transmitter may be a part of the UE 20, and the receiver may be a part of the BS 10. The BS 10 may include a plurality of receivers and a plurality of transmitters. The UE 20 may include a plurality of receivers and a plurality of transmitters.

The communication system may be a multiple antenna system. The multiple antenna system may be a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

The multiple antenna system is a communication system in which data can be transmitted through a plurality of paths by using two or more antennas, and a receiver can detect signals received via the respective paths. The multiple antenna system has characteristics such as spatial diversity, beamforming, spatial multiplexing, etc.

The spatial diversity is a technique in which a transmit signal is distributively transmitted through a plurality of antennas. The spatial diversity provides reliable operations when a channel quality indicator (CQI) is fed back from the UE with a low reliability due to fading. One example of the spatial diversity is transmit diversity. The transmit diversity includes open-loop Transmit diversity and closed-loop transmit diversity. The open-loop transmit diversity includes time switched transmit diversity (TSTD), orthogonal transmit diversity (OTS), frequency switched transmit diversity (FSTD), and space time transmit diversity (STTD). In the TSTD, OTD, and FSTD, data to be transmitted is divided into even-number-th data streams and odd-number-th data streams according to data bits and is then transmitted through corresponding different antennas. Signals transmitted through different antennas are identified by a time in the TSTD, by a code in the OTD, and by a frequency in the FSTD. In the STTD, diversity gain is obtained by transmitting a transmit signal in a spatially and temporally combined manner. Regarding the closed-loop transmit diversity, a weight factor is multiplied to each antenna.

In the beamforming, the weigh factor is multiplied to each antenna according to the channel condition so as to increase a signal to interference plus noise ratio (SINR) of a signal. The weight factor can be represented by a weight matrix, which is referred to as a precoding matrix. The UE can report a precoding matrix indicator (PMI) to help the BS determine the precoding matrix.

The spatial multiplexing is a technique in which multiple data stream is transmitted through multiple antenna to increase channel capacity, and is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). If the number of transmit antennas is Nt, and the number of receive antennas is Nr, then the number of independent MIMO channels is Ni where Ni≤min(Nt, Nr). A independent MIMO channel can be referred to as a spatial layer. A rank represents the number of non-zero eigen-values of the MIMO channel matrix and can be defined as the number of spatial layers.

Figure 2:
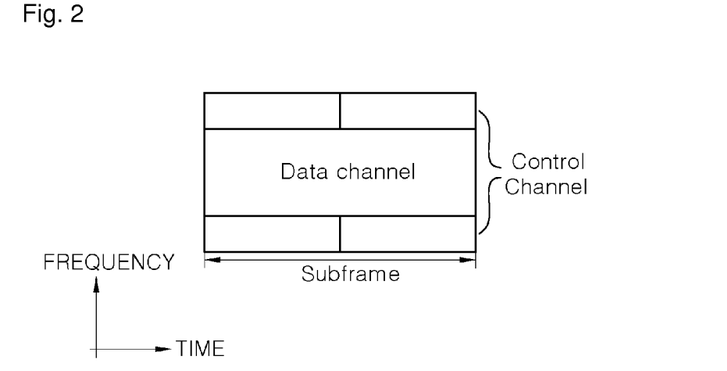
FIG. 2 shows an uplink subframe according to an embodiment of the present invention.

FIG. 2 shows an uplink subframe according to an embodiment of the present invention.

Referring to FIG. 2, an uplink subframe includes a control region which is allocated to at least one control channel and a data region which is allocated to at least one data channel. A UE cannot transmit a control channel and a data channel in one subframe. The control channel carries a control information. The data channel carries user data. Examples of the control information include a bitmap, a channel quality indicator (CQI), a PMI, a rank indicator (RI), etc.

The control channel can carry only the control information. The data channel can carry both the user data and the control information. That is, when a UE transmits only the control information, the control information can be transmitted on the control channel. When the UE transmits both the user data and the control information, the user data and the control information can be multiplexed and then transmitted on the data channel.

One radio frame includes 10 subframes. One subframe includes two slots. A time for transmitting one subframe is defined as a transmission time interval (TTI). For example, when the TTI is 1 ms, a time for transmitting one radio frame is 10 ms. One slot can be composed of a plurality of OFDM symbols. For example, one slot can include 7 or 6 OFDM symbols. A resource block (RB) which is a basic unit of radio resource assignment is defined by one slot in time domain and a plurality of subcarriers in frequency domain. For example, 12 consecutive subcarriers can be used as one RB.

Herein, the subframe divides a frequency band into 3 parts. The control region which is two parts at both ends of the frequency band is used as the control channel, and the data region which is a middle part of the frequency band is used as the data channel. Since the control channel and the data channel use different frequency bands, frequency division multiplexing (FDM) have been achieved. This is for exemplary purposes only, and thus the arrangement of the control channel and the data channel in the subframe is not limited thereto. In addition, the number of subframes included in the radio frame, the number of slots included in the subframe, and the number of OFDM symbols included in the slot can vary in various ways.

The slot allocated to each UE can be frequency-hopped in the subframe. That is, one of two slots allocated to one UE can be allocated to one side of the frequency band, and the other slot can be allocated to the other side of the frequency band. A frequency diversity gain can be obtained by transmitting the control information for one UE through the slots allocated to the different frequency bands.

Now, the number of bits required to transmit a control signal will be described. It will be assumed hereinafter that the control signal is uplink control signal of a multiple antenna system. However, the control signal can also apply without alteration for downlink control signal.

A bitmap, a CQI, a PMI, and a RI are examples of a type of the control signal. At least one RB can be allocated to one control channel. A resource block group (RBG) includes at least one consecutive RB. System bandwidth is composed of at least one RBG.

Table 1 below shows the number of bits required to transmit each control signal. It will be assumed that a best-M scheme selects M groups from a plurality of RBGs.

TABLE 1

The number of bits for control signals

| | Bitmap | CQI (1-st layer) | CQI (other layers) | PMI |
|---|---|---|---|---|
| without order | cc – 1 [$\log_2(_cC_M)$] | B × (M + 1) B + $B_d$ × M | $B_d$ × (M + 1) | P × (M + 1) |
| with order | c + 1 [$\log_2(_cP_M)$] | | | |

In Table 1, c denotes the total number of RBGs, M denotes the number of selected RBGs, B denotes the number of bits for a CQI, $B_d$ denotes the number of bits for differential value of the CQI, and P denotes the number of bits for a PMI. $_cC_M$ is a probability combination which indicates that M RBGs are selected from c RBGs, and $_cP_M$ is a probability permutation which indicates that M RBGs are selected from c RBGs. [x] denotes smallest integer larger than x.

The bitmap is information indicating which at least one RBG is selected from total RBGs. The number of bits for the bitmap may be the same as the total number of RBGs. That is, one bit in the bitmap can correspond to one RBG. For example, when the total number of RBGs is 5, the bitmap has 5 bits, and thus the selected RBGs can be indicated in such a manner that a bit corresponding to a selected RBG in the bitmap is set to '1'. For example, when the second and fourth RBGs are selected from the 5 RBGs, the bitmap can be represented as '01010'.

Alternatively, the bitmap may have the number of bits less than the total number of RBGs. For example, among 5 RBGs, only 4 RBGs can correspond to respective bits of 4-bit bitmap and one remaining RBG is reserved. If the number of '1' in the bitmap is two, two RBGs are selected from the 5 RBGs and the remaining RBG is not selected. If the number of '1's in the bitmap is one, the remaining RBG is selected. Therefore, overhead can be reduced by one bit in comparison with the case where the number of bits for the bitmap is the same as the total number of RBGs.

The number of bits for the bitmap may be [$\log_2(_cC_M)$] when M RBGs are selected from c RBGs. In proportion to the number of RBGs, the bitmap can be indicated by using the less number of bits in comparison with the aforementioned two methods.

When the bitmap also indicates the order of the selected RBGs, one ordering bit indicating the order is further added to the bitmap. For example, when the ordering bit is set to '1', the order of the selected RBGs can be a descending order, and when the ordering bit is set to '0', the order of the selected RBG can be an ascending order. Of course, on the contrary, the order of the selected RBGs can be the ascending order when the ordering bit is set to '1' and can be the descending order when the ordering bit is set to '0'.

The number of bits for the bitmap used to select M RBGs in consideration of the order from c RBGs can be expressed by [$\log_2(_cP_M)$].

A CQI indicates channel condition between the BS and the UE and may have various formats such as a Signal-to-Interference plus Noise Ratio (SINR), a modulation and coding scheme (MCS) level, a data rate indicator, a received signal strength indicator, etc. The number of bits for the CQI can vary depending on quantization level. In general, the CQI has the number of bits B in the range of 4 to 6. The CQI which represents downlink channel condition is generated and reported by the UE. In case of the multiple antenna system, it is needed to report the CQI for each rank.

A total number of bits for CQI which represents c RBGs for one rank may be B×(M+1). According to the best-M scheme, M RBGs are selected from c RBGs according to CQI of the each RBG. M CQIs for the M RBGs and a average CQI for the remaining RBGs or all RBGS are transmitted.

Alternatively, the number of bits for CQI can be B+$B_d$×M. Among CQIs of the selected M RBGs, only one full CQI is transmitted in B bits, and the remaining M−1 CQIs are transmitted in $B_d$ bits corresponding to a differential value thereof. The full CQI is for a best RBG having best CQI. An average CQI of the unselected remaining RBGs are transmitted in the $B_d$ bits corresponding to the differential value.

A layer is an independent MIMO channel, and the number of layer corresponds to a rank. For example, there is one layer for rank 1, or there are two layers for rank 2. The layer is composed of at least one RBG and CQIs for RBGs are obtained every available layer.

When there are a plurality of layers (rank>1), the first layer is firstly selected as a representative layer in which a best RBG may belong or which may correspond to rank 1. Secondly, CQIs of the first layer can be constructed so as to the number of bits is B×(M+1) or B+$B_d$×M, and CQI of each of other layers can be constructed in the format of an average CQI. Or, CQI of each of other layers can be constructed so that the selected RBGs in each of the other layers correspond to those in the first layer. Finally, CQIs of the first layer and CQI of the other layers are reported to the BS. CQIs of each of the other layers can be differential value with respect to those of the first layer. The number of bits for CQIs for each of the other layers may be $B_d$×(M+1) when the number of selected RBGs is M.

A number of bits for PMIs in a layer can be P×(M+1) where P denotes the number of bits for one PMI. In general, one PMI can be represented in 2 to 6 bits. M RBGs are selected from a plurality of RBGs, and then PMIs of the M RBGs are transmitted in P bits and a P-bit average PMI is transmitted by averaging PMIs of the remaining RBGs or all RBGs. The average PMI corresponds to a precoding matrix showing an optimal signal to noise ratio (SNR) when applying the precoding matrix to the remaining RBGs or all RBGs. For simplicity, M+1 PMIs be generated after dividing a plurality of RBGs into M+1 sub-RBGs. For example, in case of best-2 scheme, RBGs having similar channel condition can be grouped to generate 3 sub-RBGs, and the PMIs for 3 sub-RBGs can be transmitted. Here, although the number of resource groups for the PMI is same as that of resource groups for the CQI, a resource block group corresponding to the PMI may be larger in size than a resource block group corresponding to the CQI.

An RI can be defined as the number of layers. The RI can be generally represented in 1 to 3 bits.

Table 2 below shows the number of bits required to transmit full control information including a bitmap, a CQI and a PMI.

TABLE 2

| | The number of bits for full control information |
|---|---|
| without order | $c + (B + B_d + P) \times (M + 1)$ |
| | $c - 1 + (B + B_d + P) \times (M + 1)$ |
| | $[\log_2 ({}_cC_M)] + (B + B_d + P) \times (M + 1)$ |
| with order | $c + 1 + B - B_d + (2 \times B_d + P) \times (M + 1)$ |
| | $[\log_2 ({}_cC_M)] + B - B_d + (2 \times B_d + P) \times (M + 1)$ |
| | $[\log_2 ({}_cP_M)] + (B + B_d + P) \times (M + 1)$ |

Full control information including the bitmap, the CQI, and the PMI can be represented in a variety of bit lengths. The number of bits for the full control information can have various values according to how the full control information is expressed. Table 2 is shown for exemplary purposes only, and thus the number of bits for the full control information is not limited thereto. For example, the full control information may further include the RI.

For example, if c=5, M=2, B=5, $B_d$=3, and P=3, the full control information is represented in minimum 37 bits when the order is not considered. The bitmap is represented in 4 bits. The CQI of the first layer is represented in 15 bits. CQIs of other layers are represented in 9 bits. The PMI is represented in 9 bits. When the order is taken into account, the full control information is represented in minimum 34 bits, wherein the bitmap occupies 5 bits, the CQI of the first layer occupies 11 bits, the CQIs of other layers occupy 9 bits, and the PMI occupies 9 bits.

If c=10, M=2, B=5, $B_d$=3, and P=3, the full control information is represented in minimum 39 bits when the order is not considered, wherein the bitmap occupies 6 bits, the CQI of the first layer occupies 15 bits, the CQIs of other layers occupy 9 bits, and the PMI occupies 9 bits. When the order is taken into account, the full control information can be represented in minimum 36 bits, wherein the bitmap occupies 7 bits, the CQI of the first layer occupies 11 bits, the CQIs of other layers occupy 9 bits, and the PMI occupies 9 bits.

The full control information may be transmitted over a plurality of subframes. At least one control signal (e.g., CQI, PMI, RI, etc.) may be transmitted on the control channel. The full control information may be transmitted on the data channel. When the full control information is transmitted on the data channel, data rate may decrease but the full control information can be transmitted completely in one subframe.

Figure 3:
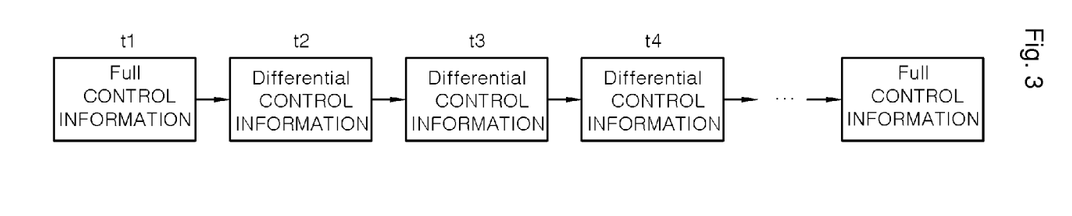
FIG. 3 shows a method of transmitting control information according to an embodiment of the present invention.

FIG. 3 shows a method of transmitting control information according to an embodiment of the present invention.

Referring to FIG. 3, full control information can be transmitted with a long transmission period, and differential control information can be transmitted with a shorter period than the full control information.

The full control information includes a bitmap, a CQI of a first layer, CQI of other layer, a PMI, an RI, etc. The full control information may be distributively transmitted on a control channel in at least one subframe or may be transmitted on a data channel. The differential control information has a value indicating a difference with respect to the previously transmitted CQI or PMI or the full control information. When the differential control information is transmitted, the bitmap may not be transmitted. This is because there is almost no change in a bitmap.

Table 3 below shows an example of the differential control information transmitted in various manners. In this method, a CQI differential value ΔCQI, a PMI, and an RI are transmitted over time. Herein, the CQI differential value may be a difference with respect to a CQI included in the full control information or a difference with respect to a previous CQI. The PMI and the RI are measured at a corresponding time.

TABLE 3

| | t1 | t2 | t3 | t4 |
|---|---|---|---|---|
| fullcontrolinformation | ΔCQI | PMI | ΔCQI |
| | ΔCQI (first layer) | ΔCQI (other layers) | PMI |
| | ΔCQI | ΔCQI/PMI | ΔCQI |
| | ΔCQI (first/other layers) | PMI/RI | ΔCQI (first/other layers) |

After the full control information is transmitted, the CQI differential value and the PMI can be alternately transmitted. For example, the full control information is transmitted at t1, the CQI differential value is transmitted at t2, the PMI differential value is transmitted at t3, and the CQI differential value is transmitted at t4. The CQI differential value at t2 is a difference between the CQI included in the full control information transmitted at t1. The CQI differential value at t4 may be a difference between the CQI included in the full control information transmitted at t1 and the CQI measured at t4 or may be a difference between the CQI at t2 and the CQI at t4. The PMI is inappropriate to be represented as a differential value because the PMI is selected from a codebook. Therefore, the PMI may be transmitted without alteration instead of a PMI differential value.

The CQI differential value of the first layer, the CQI differential values of other layers, and the PMI may be alternately transmitted. For example, the CQI differential value of the first layer is transmitted at t2, the CQI differential values of other layers are transmitted at t3, and the PMI is transmitted at t4. Herein, c=5, M=2, B=5, $B_d$=3, and P=3. When it is assumed that a control channel can transmit a maximum of 10 bits, 34-bit full control information is transmitted on the control channel over 4 subframes or is transmitted on a data channel. The CQI differential value of the first layer, the CQI differential value of a second layer, and the PMI may be 9 bits, and may be transmitted in one subframe.

Transmission may be repeated in such a manner that only the CQI differential value is transmitted after the full control information is transmitted, and thereafter the CQI differential value is transmitted together with the PMI. This means that transmission period of CQI is shorter than that of PMI. For example, only the CQI differential value is transmitted at t2, the CQI differential value and the PMI are transmitted at t3, and only the CQI differential value is transmitted at t4.

Transmission can be repeated in such a manner that the CQI differential value of the first layer is transmitted together with the CQI differential values of other layers and then the PMI is transmitted together with the RI. For example, the CQI differential value of the first layer is transmitted together with the CQI differential values of other layers at t2, the PMI is transmitted together with the RI at t3, and the CQI differential value of the first layer is transmitted together with the CQI differential values of other layers at t4.

Table 3 above is shown as an example of transmitting differential control information during a transmission period of the full control information, and the present inventive concept is not limited thereto. For example, one PMI may be transmitted after a plurality of CQI differential values are transmitted, and the CQI differential value of the first layer may be more frequently transmitted than those of other layers. In addition, when only the first layer is used or when the PMI is not necessary, transmission of the CQIs of other layers and the PMI can be skipped, and the skipped portion can be used as a region for transmitting an acknowledgement (ACK)/not-acknowledgement (NACK) signal or a pilot signal.

Figure 4:
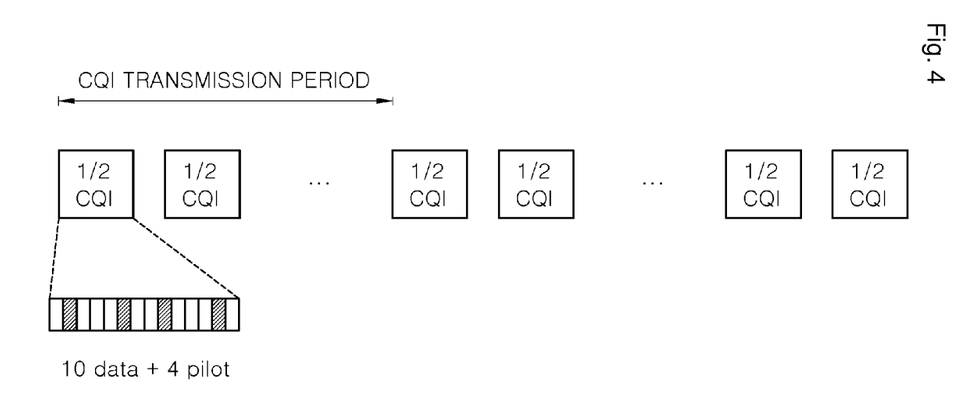
FIG. 4 shows a method of transmitting control information according to another embodiment of the present invention.

FIG. 4 shows a method of transmitting control information according to another embodiment of the present invention. This can apply a system having a rank 1.

Referring to FIG. 4, when full control information includes control information for one layer and is transmitted on a control channel, the control information can be distributively transmitted according to a transmission period of a CQI.

For example, when the best-M scheme is used and when c=5, M=2, B=5, and $B_d$=3, if it is assumed that the full control information is bitmap and the CQI, the number of bits for the full control information is the sum of the number of bits for the bitmap, the number of bits for CQIs for selected two RBGs, and the number of bits for an average CQI for the remaining RBGs. The selected two CQIs may be a highest CQI and a second CQI. The second CQI may indicate a differential value with respect to the highest CQI. Therefore, the number of bits for the full control information is 18 bits, that is, 5 bits (bitmap)+5 bits (highest CQI)+3 bits (second CQI)+5 bits (other CQIs).

When the control channel in one subframe is allocated to 10 data subcarriers and 4 pilot subcarriers, that is, the number of bits that can be transmitted through the control channel is 10 bits when using BPSK modulation, then 18-bit full control information is transmitted in two subframes. 9 bits are carried on a first subframe, and the remaining 9 bits are carried on a second subframe, thereby the full control information can be transmitted.

A CQI transmission period can be determined to be longer than a general CQI transmission period. A CQI differential value can be transmitted during the CQI transmission period. The CQI differential value may be a difference with respect to the CQI included in the full control information or may be a difference with respect to the previously transmitted CQI. The CQI differential value can be represented in 3×3=9 bits and can be transmitted through one subframe.

Figure 5:
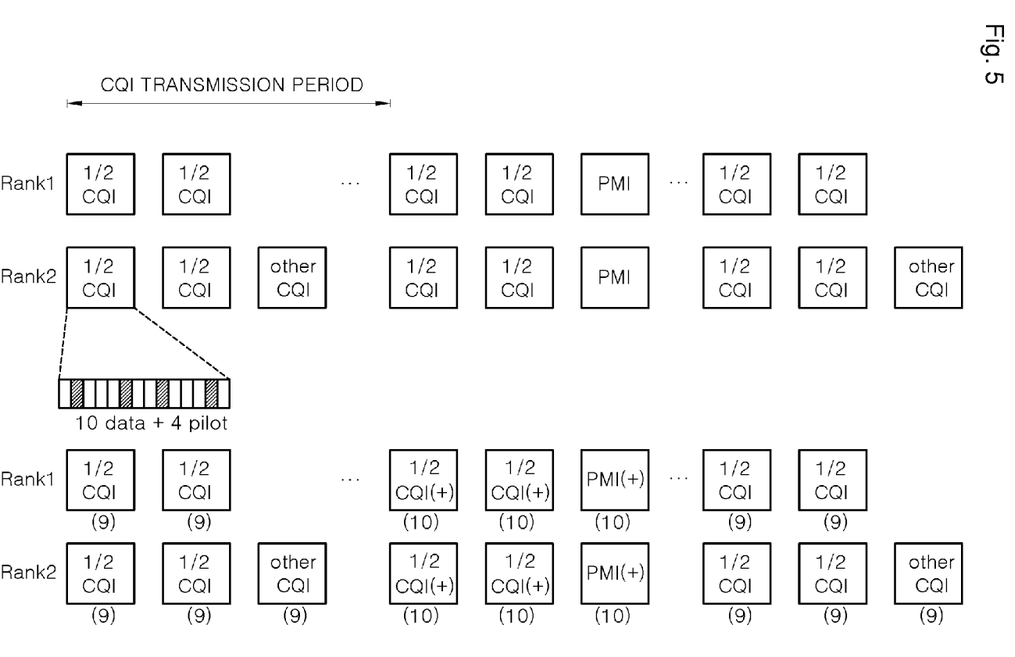
FIG. 5 shows a method of transmitting control information according to another embodiment of the present invention.

FIG. 5 shows a method of transmitting control information according to another embodiment of the present invention. This can apply a system having a rank larger than 1.

Referring to FIG. 5, full control information for a plurality of layers can be transmitted on a control channel in a distribution manner in at least one subframe. In this case, a CQI of a first layer is transmitted at every CQI transmission period, and CQIs of other layers and a PMI are transmitted with a time interval much longer than the CQI transmission period.

For example, when the best-M scheme is used and when M=2, B=5, $B_d$=3, and P=3, and if it is assumed that the full control information includes a bitmap, the CQI, and the PMI, then the number of bits of the full control information is the sum of the number of bits of the bitmap, the number of bits of the CQI of the first layer, the number of bits of the CQI of other layers, and the number of bits of the PMI. The number of bits of the bitmap is 5 bits. The number of bits of the CQI of the first layer is 13 bits, that is, a sum of the number of bits (5 bits+3 bits) of selected two bands CQIs and the number of bits (5 bits) of an average value of the CQIs of remaining RBGs. The number of bits of the CQIs of other layers is 9 bits, that is, a sum of a differential value (3 bits) with respect to the highest CQI of the first layer, a differential value (3 bits) with respect to the second CQI of the first layer, and a differential value (3 bits) with respect to an average value of the remaining bands CQIs of the first layer. The number of bits of the PMI may be 3×3=9 bits or 4×3=12 bits for three RBGs. When the number of bits of PMIs is 9 bits, the number of bits of the full control information is 36 bits, that is, 5 bits (bitmap)+13 bits (CQI of first layer)+9 bits (CQIs of other layers)+9 bits (PMI).

When the control channel in one subframe is allocated to 10 data subcarriers and 4 pilot subcarriers, that is, when the number of bits that can be transmitted on the control channel is 10 bits, the full control information can be transmitted in 4 subframes.

When a rank of the multiple antenna system is one, that is, when only the first layer is available, there is no need to transmit the CQIs of other layers. Therefore, the number of bits of the full control information is 27 bits. The CQI can be transmitted at every CQI transmission period. The PMI can be transmitted with a period longer than that of the CQI. For example, the bitmap and the CQI may be distributively transmitted by occupying respective 9 bits of two subframes. Then, in a next CQI transmission period, the bitmap, the CQI, and the PMI may be distributively transmitted by occupying respective 9 bits of three subframes. That is, control information including the PMI and control information not including the PMI can be alternately transmitted according to the CQI transmission period.

When the rank is two, that is, when both first and second layers are available, 36-bit full control information can be distributively transmitted through 3 subframes according to the CQI transmission period, instead of transmitting the full control information by using 4 subframes at once. First, among the full control information, the bitmap, the CQI of the first layer, and the CQIs of other layers are distributively transmitted to occupy respective 9 bits of 3 subframes. In a next CQI transmission period, the bitmap, the CQI of the first layer, the PMI are distributively transmitted to occupy respective 9 bits of three subframes. The CQI of the first layer is transmitted at every CQI transmission period. The CQIs of other layers and the PMI are alternately transmitted according to the CQI transmission period.

If the number of bits of the PMI is 12 bits, 10-bit PMI may be carried on one subframe, 1-bit PMI may be added to each of two other subframes to be transmitted at the same CQI transmission period. This can apply to both cases (when the rank is one and when the rank is two).

When 9-bit control information is carried on the control channel that can carry maximum 10-bit control information, a (9,20)-coding scheme or a (10,20)-coding scheme may be used to reserve one bit. The reserved one bit may always carry '1', so as to be used for a pilot. Alternatively, a 1-bit ACK/NACK signal (or RI) can be transmitted by carrying it on the reserved bit.

The number of subframes on which the full control information is distributively carried is for exemplary purposes only, and the present invention is not limited thereto. The number of bits of the full control information may vary depending on a type of control information included. The number of bits of the control information that can be carried on the control channel of one subframe may also vary. In addition, since the multiple antenna system uses two or more transmit antennas, the rank may be two or higher. Even if the rank is two or higher, the control information can be transmitted in the same manner as when the rank is two.

Figure 6:
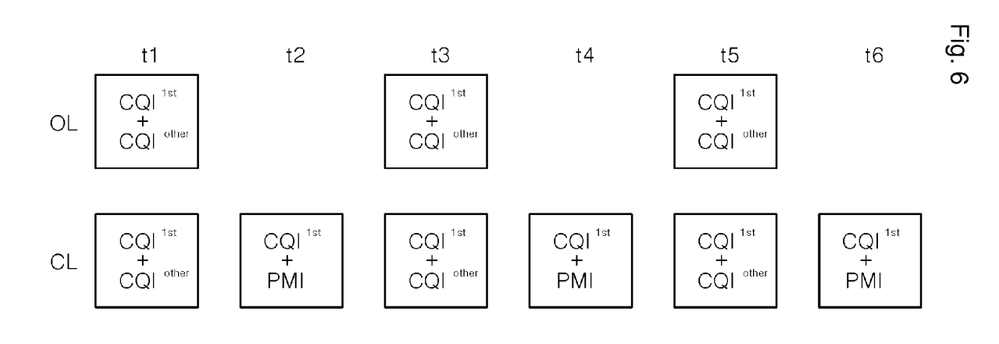
FIG. 6 shows a method of transmitting control information according to another embodiment of the present invention.

FIG. 6 shows a method of transmitting control information according to another embodiment of the present invention. The method of transmitting control information may apply to an open loop (OL) system and a closed loop (CL) system in a different manner.

Referring to FIG. 6, in the OL system, only a CQI of a first layer and CQIs of other layers are transmitted because a PMI is not required in the OL system. In this case, the OL system can transmit only one CQI with respect to a system frequency band, and can have a longer CQI transmission period than that of the CL system. For example, if B=5, the CL system can transmit full control information through one subframe. Even if an RI is included in the full control information, the full control information can be transmitted together with the CQI through one subframe. In addition, the RI can be transmitted with a longer transmission period than that of the CQI or may be transmitted separately from the CQI.

In the CL system, the PMI has to be transmitted when a codebook is used. Therefore, the CQI of the first layer, the CQIs of other layers, and the PMI are transmitted. In this case, according to the CQI transmission period, the CQI of the first layer and the CQIs of other layers may be transmitted in a current time, and the CQI of the first layer and the PMI may be transmitted in a next time. In addition, the CL system has a shorter CQI transmission period than that of the OL system. In the CL system, the CQI and the PMI are required for each RBG. Thus, the number of bits of the full control information increases to be larger than that of the OL system. The full control information is distributively transmitted through a plurality of subframes. The CQIs of other layers can be represented by a differential value with respect to the CQI of the first layer, or instead of increasing the CQI transmission period, the CQI differential value can be transmitted during the CQI transmission period, thereby reducing overhead.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting control information in a multiple antenna system, the method comprising: transmitting a channel quality indicator (CQI) of a first layer, wherein the CQI of the first layer comprises M number of CQIs for selected M resource block groups of the first layer and an average value of CQIs for remaining resource block groups of the first layer; transmitting a differential value between the CQI of the first layer and a CQI of a second layer, wherein the CQI of the second layer comprises M number of CQIs for selected M resource block groups of a plurality of layers and an average value of CQIs for the plurality of layers, and wherein the selected M resource block groups of each of the plurality of layers correspond to the selected M resource block groups of the first layer; transmitting a precoding matrix indicator (PMI), wherein the PMI comprises M number of PMIs for selected M resource block groups among a plurality of resource block groups and an average value of PMIs for remaining resource block groups among the plurality of resource block groups, and wherein a resource block group corresponding to the PMI is larger in size than a resource block group corresponding to the CQI; and wherein transmitting the control information is a closed loop system, in which CQI of the first layer and the differential value are transmitted in a current time and the CQI of the first layer and the PMI are transmitted in a next time.

2. The method of claim 1, wherein the selected M resource groups of the first layer have best M CQI among all resource block groups of the first layer.

3. The method of claim 1, wherein the first layer is a layer which includes a resource block group having the best CQI among all resource block groups of a plurality of layers.

4. The method of claim 1, further comprising:
transmitting a differential value between the CQI of the first layer and a CQI of the first layer in a next transmission period.

5. The method of claim 1, wherein the first layer is a layer corresponding to rank 1.

* * * * *